US005767505A

United States Patent [19]

Mertens et al.

[11] Patent Number: 5,767,505

[45] Date of Patent: Jun. 16, 1998

[54] METHOD AND SYSTEM FOR DETERMINING TOLL CHARGES FOR TRAFFIC ROUTES AND/OR AREAS

[75] Inventors: Reinhold Mertens, Pegnitz; Werner Kremer, Bad Honnef; Uwe Pertz, Bergheim; Roland Mahler, Sankt Augustin, all of Germany

[73] Assignee: DeTe Mobil Deutsche Telekom Mobilnet GmbH, Bonn, Germany

[21] Appl. No.: 682,687

[22] PCT Filed: Jan. 27, 1995

[86] PCT No.: PCT/DE95/00107

§ 371 Date: Sep. 30, 1996

§ 102(e) Date: Sep. 30, 1996

[87] PCT Pub. No.: WO95/20801

PCT Pub. Date: Aug. 3, 1995

[30] Foreign Application Priority Data

Jan. 28, 1994 [DE] Germany .......................... 44 02 613.7

[51] Int. Cl.$^6$ .......................... G06F 29/00; G08G 1/123; G08G 1/01

[52] U.S. Cl. .......................... 235/615; 340/988; 340/933

[58] Field of Search .................................... 235/615, 384; 364/401, 400, 454; 340/988, 936, 933, 937, 23, 51, 40

[56] References Cited

U.S. PATENT DOCUMENTS

| | | | |
|---|---|---|---|
| 4,303,904 | 12/1981 | Chasek | 340/40 |
| 5,144,553 | 9/1992 | Hassett et al. | 364/401 |
| 5,347,274 | 9/1994 | Hassett | 340/988 |
| 5,406,275 | 4/1995 | Hassett et al. | 340/933 |

*Primary Examiner*—Adolf Berhane
*Assistant Examiner*—Rajnikant B. Patel
*Attorney, Agent, or Firm*—Gray Cary Ware & Freidenrich

[57] ABSTRACT

With the proposed method and system for determining toll charges for traffic routes and areas, toll charges are calculated with the aid of a device installed in the vehicle on the basis of positional and tariff data. The data are then transmitted via a data transmission system to a central point, with the possibility of verification of the appropriate charge.

24 Claims, 2 Drawing Sheets

METHOD AND SYSTEM FOR DETERMINING TOLL CHARGES FOR TRAFFIC ROUTES AND/OR AREAS

Figure 1:
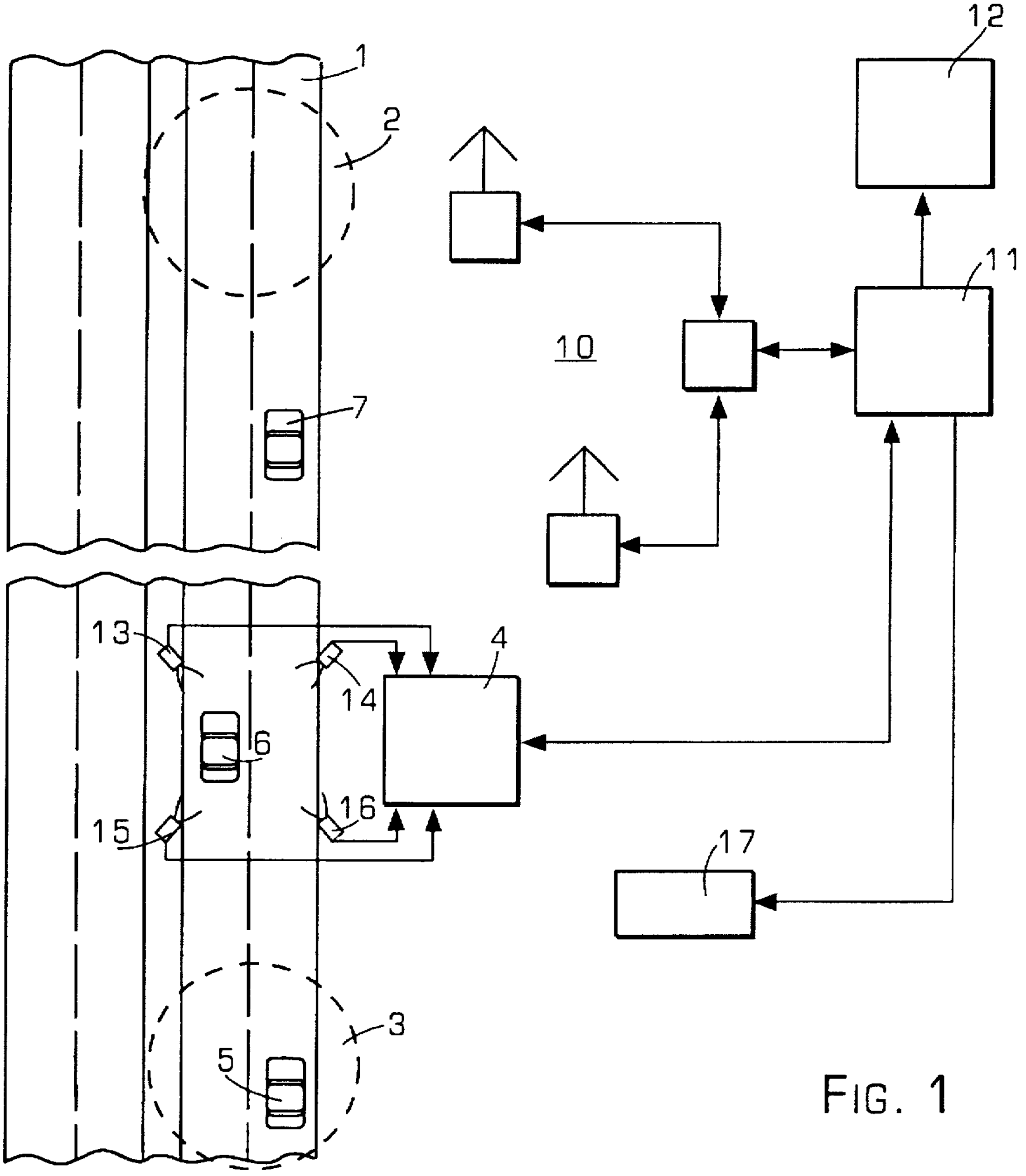

The invention relates to a method and a system for determining user fees for traffic routes and/or traffic areas.

Various methods have become known for collecting user fees (tolls) for traffic routes, in particular roads. However, up to now only toll stations, where vehicles stop and are permitted to use the road subject to fees after having paid the toll, have found general use. In spite of a plurality of individual toll booths, this leads to traffic jams on high-density roads. Even devices wherein a coin is tossed into a funnel while moving slowly provide only limited relief.

In addition to this, methods for the automatic determination and debiting of user fees have become known. In connection with the method described in NTZ, vol. 46 (1993), issue 4, "Zukünftige automatische Geb ührenerfassung für den Straβgenverkehr" [Future Automatic Fee Registration for Road Traffic], collecting stations are equipped with devices wherein communication takes place between the collecting point and the vehicle. For this reason monitoring of payment must take place directly during the passage past the collecting point, most often designed as a bridge. Communication is furthermore only possible within locally limited zones in order to assure unambiguity between the communicants and the vehicle detected by a camera. Furthermore, it is not possible because of the limited communication times to apply the security procedures in connection with electronic money transfer, common in the banking and credit industry. In addition, all vehicles must be equipped with terminal devices capable of communication in order to be able to pass by the monitor cameras, so that they will not be recorded and considered to be non-payers.

A considerable outlay for collecting stations and a limited communications time also occur with such systems even if the calculation of the fees takes place in the vehicle, as in WO 91/18354.

A detection system described in VDI Nachrichten [News] of Aug. 20, 1993, pages 2 to 3, utilizes a detection of the position of the vehicle with the aid of the GPS system (global positioning system), by means of which a position detection by satellite is performed. With this, only virtual collecting stations are required, so that the outlay for suitable buildings can be omitted. Control of the respective debit is based on a combination consisting of a beacon system and a camera. The steps relating to security of the money transfer occur exclusively and locally in the vehicle. Since the charging of fees only takes place in the vehicle, it is not possible to provide indexing of the fee structure based on the traffic. Just as in the first described method, a control is only possible during the limited connection time between the controlling vehicle and a fixed station.

Also, all vehicles must be equipped with electronic devices for passing over a toll road section.

A vehicle control and target-guidance system known from WO 92/10824 can be used for toll payments in that beacons are used for location determination for a fee calculation taking place in connection with the vehicle. As in a system known from GB 22 48 957 A, the fees are then debited to an account card. Since the calculation takes place only in the vehicle, the indexing of the fee structure in accordance with the traffic is not possible.

It is the object of the instant invention to suggest a method for determining the user fees for traffic routes, which operates with a small outlay in respect to stationary devices, and wherein an assured transfer of the respectively determined user fees is possible until they are debited to an account or a credit account of the user.

This object is attained in accordance with the invention in that user fees are calculated on the basis of position data and fee data and transferred to a central point via a data transmission system. The method in accordance with the invention has the advantage that it is possible to utilize a basically existing infrastructure, such as the GPS system and digital mobile radio networks. In connection with the method of the invention it is furthermore advantageous that sufficient time is available for transmitting the user fees, so that all measures for securing the transmission are possible. Furthermore, collecting of the fees and monitoring are decoupled from each other chronologically and spatially.

The method in accordance with the invention is usable not only in connection with roads, but also with other traffic routes, such as air and water routes and rail lines. It is furthermore possible with the method in accordance with the invention to determine fees for traveling in defined traffic areas, such as the center areas of cities.

A further development of the method in accordance with the invention consists in that the respectively charged user fees are added up in a memory inside the vehicle, and that the transmission to the central point takes place at a predetermined amount of the added-up user fees. In this connection it is preferably provided that by means of the transfer to the central point a corresponding credit is stored in the memory, to which the respectively calculated fees are debited.

On the one hand, this further development has the advantage that the transmission paths in the data transmission system are not continuously occupied—i.e. by small sums—. Furthermore, the data transmitted to the central point in accordance with this further development do not permit any conclusions regarding the details of the routes traveled, which is important in connection with the protection of personal data.

However, in order to make possible a control of the determination or debiting, it is provided in accordance with another development that control data are temporarily stored in the memory which allow the control of the fee calculation, in particular data which identify the vehicle, the traveled route, date, time and the respectively applied fee structure.

These control data can be stored at the discretion of the user in case of a possibly required complaint. But they can also be used for controls during travel on the toll road. In connection with the method of the invention, it is advantageous if the memory is a chip card. Many advantages are connected with this as a result of the chip card per se, for example the storage of a personal identification and the option of carrying the chip card on the person when not using the vehicle, so that in case of unauthorized vehicle use the user fees are also not debited to the vehicle owner. It is possible to implant the function for the method in accordance with the invention on a chip card which also is used as the user identification for a mobile radio network.

The employment of the GPS system mentioned at the outset for determining the position basically makes a continuous position determination possible, so that the user fees can be calculated in accordance with actually driven kilometers. However, often a division of the traffic routes subject to a fee into individual sections located between collecting points will be useful. In this case the position data are associated with the positions of predetermined collecting points.

In addition to the option of providing virtual collecting points by means of a position determination system, such as the GPS system, it is also possible in connection with the method of the invention to use collecting points in the form of beacons or induction loops. In this case the method in accordance with the invention has the advantage over the known methods that at these collecting points it is only necessary to provide the passing vehicles with an identification of the respective collecting point. This can take place in a very short time and regardless of whether one or several vehicles are simultaneously located in the area of the collecting point, and in which lanes these vehicles are located.

The use of radio locating systems, such as the GPS system, is made possible in a further development of the method in accordance with the invention in that the position of the vehicle is continuously determined with the aid of the device in the vehicle and is compared with a predetermined position unique to a collecting point, and that upon agreement the respective position in the form of position data is made the basis of the calculation of the user fees.

In the process it is possible for the positions of the collecting points to be stored in the device inside the vehicle, or that positions of collecting points are transmitted in chronological intervals via the data transmission system, or that the positions of collecting points in a locally limited area are regularly transmitted via the data transmission system.

Depending on the requirements for indexing the fee structure, it can be provided that fee structure data are permanently stored in the device inside the vehicle in the form of a data bank, or that the fee structure data are transmitted from time to time via the data transmission system and stored in the vehicle device, or that fee structure data for the respectively one locally limited area are regularly transmitted via the data transmission system.

In connection with the method of the invention, the control of the fee determination and debiting can take place in an advantageous manner by means of the monitoring devices connected downstream of the collecting points in that the vehicle device is informed via the data transmission system which collecting points have downstream connected monitoring devices, that at these collecting points the vehicle device reads the control data set of the fee calculation out of the memory at the respective collecting point and via the data transmission system transmits it to the monitoring device, which compares the received data with the characteristics (motor vehicle license number, type of motor vehicle) which can be detected by the monitoring point.

For protecting data relating to a person, it is possible in the process to provide for the data obtained by the monitoring device to be canceled if they agree with the control data received by the monitoring device. In case of unauthorized use of the traffic route subject to fees, however, storage of the data is then required until the time the matter is cleared up and possible compulsory measures are initiated by the responsible agencies.

If the method of the invention is used, vehicles not equipped with a vehicle device suitable for the method in accordance with the invention, which use the route subject to fees by means of prepayment of the user fee, can also pass the monitoring devices without trouble. In a further development of the method it is provided for this that further control data are generated if a user fee for a defined route is paid for a defined motor vehicle license number at a payment point, and that the control data are provided to one or several monitoring devices which are located in the area of the route for which a user fee was paid.

The transmission of the date to the central point can be assured by the method in accordance with the invention in that the data transmission is secured by means of methods for authentication and encrypting, known per se. The DES method is preferably employed for encrypting.

An advantageous embodiment of this further development provides that motor vehicle license numbers are one-way encrypted, preferably by means of a triple DES method. Although a dependable comparison during monitoring is possible by means of a license number encrypted in such a way, the license number itself can no longer be calculated from the encrypted code. For an additional increase in security it can be provided in this case that the key provided for encrypting the motor vehicle license number is indexed. The actual key index to be used by the security module (chip card in the vehicle or security area of the payment point) is then transmitted via a communication which is also encrypted. If all security-relevant sequences in the vehicle device in the chip card and all security-relevant sequences at the central point and the payment point are performed in secured areas (so-called security boxes), this adds to further security.

An advantageous employment of the existing infrastructure is possible in accordance with an advantageous embodiment of the invention in that the data transmission system is a digital mobile radio network, in accordance with the GSM standard.

An arrangement for executing the method in accordance with the invention is characterized in that the device located in the vehicle; comprises a position determination device for the generation of position data which report the respective position of the vehicle, a processor for the calculation of user fees from the position data and the stored fee structure data, a terminal device of a digital mobile radio network for transmitting the calculated user fees to a central point, an input and an output unit.

This arrangement has the advantage that practically all components are available in embodiments suitable for the vehicle, for example by means of mobile radio networks and position determination systems.

A further advantageous arrangement is characterized in that the device located in the vehicle constitutes a structural unit together with the car radio. Additional measures for receiving and electrically connecting the vehicle device are therefore not required. In this case the antenna can be designed in such a way that it is used both as the receiving antenna for the car radio and as the antenna for the mobile radio.

A further development of this arrangement consists in that an indicator device (display) of the car radio is used as the output unit. The arrangement can be furthermore designed in such a way that a keyboard, preferably initiated by infrared transmission, is used as the input unit.

By means of the simultaneous employment of a position detection system and a mobile radio network, an emergency call can also be issued in a simple manner by data transmission by means of the method of the invention in that by the actuation of a suitable operating element the vehicle device is caused to transmit the respective position inclusive of an identification that this is an emergency call. Then this information can be passed on, for example via an appropriate data line from the central point to a police department and displayed there. Informing technical emergency services, for example, is also possible in the same way. In the case of an emergency call, anonymity is waived for practical reasons and the motor vehicle license number is transmitted without encryption.

Figure 2:
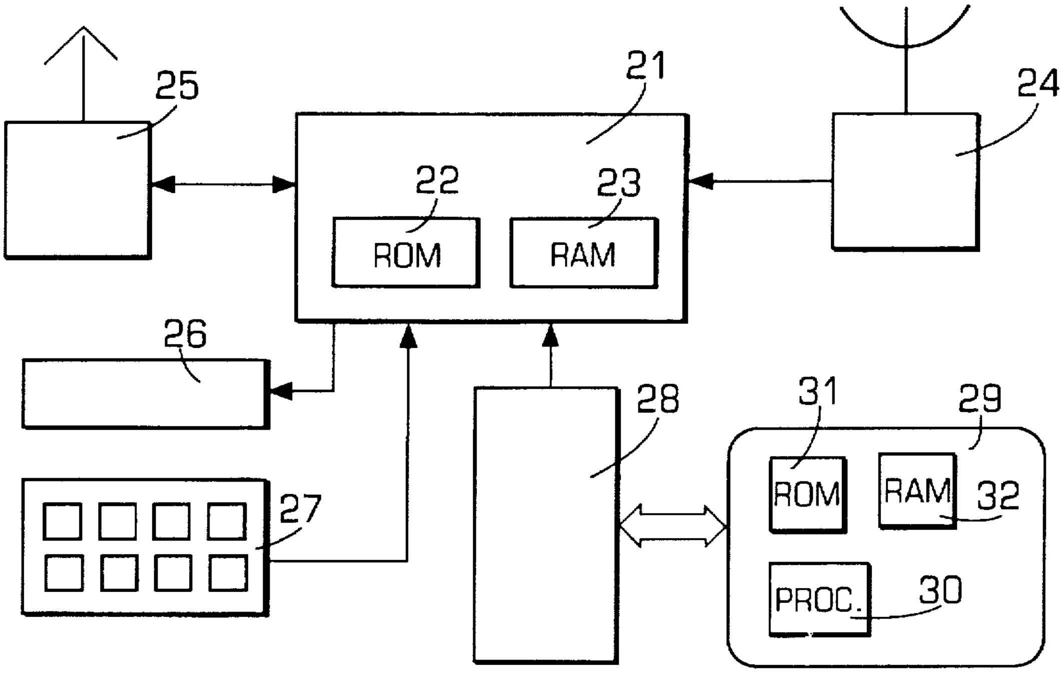
Figure 3:
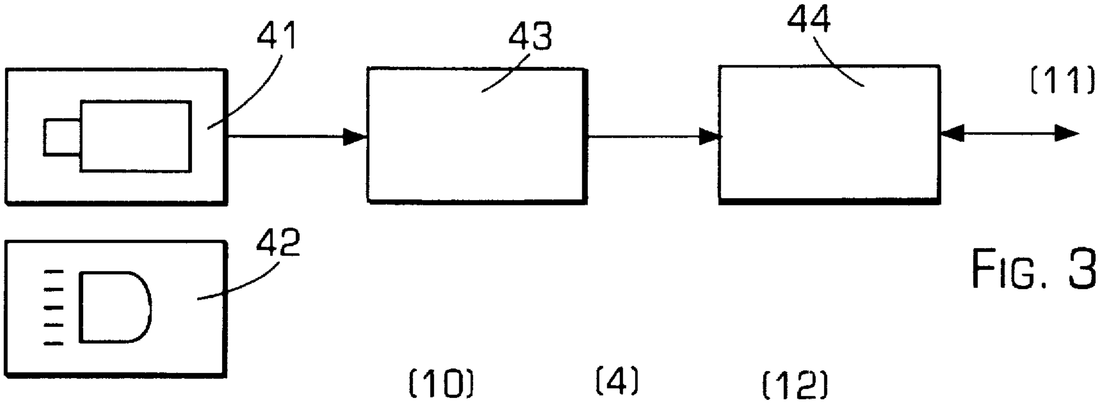
Figure 4:
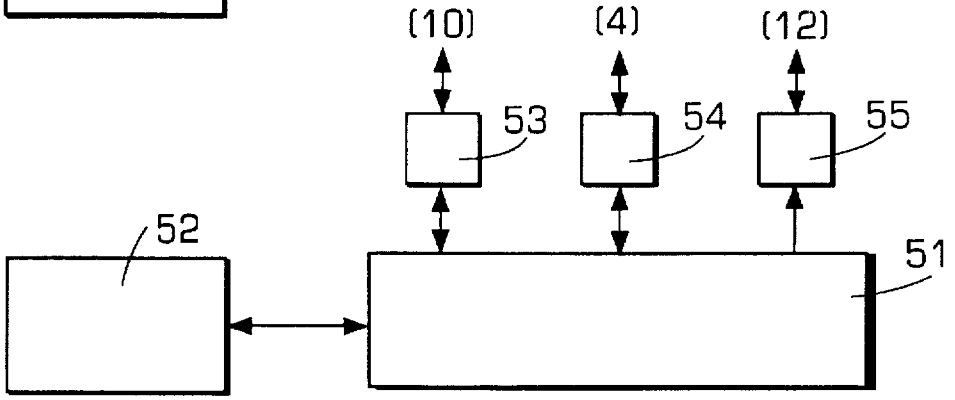

Exemplary embodiments of the invention are represented in the drawings by means of several figures and are explained in detail in the following description. Shown are in:

FIG. 1, a schematic representation of devices for executing the method in accordance with the invention, FIG. 2, a block circuit diagram of a vehicle device, FIG. 3, a block circuit diagram of a monitoring device, and FIG. 4, a block circuit diagram of a central device.

FIG. 1 shows a road 1 subject to fees with respectively two lanes in each direction. Two virtual collecting points 2, 3 are located on the interrupted section of the road 1. A monitoring station 4 is associated with the collecting station 3. A vehicle 5 is located at the virtual collecting station 3, another vehicle 6 in the area of the monitoring device 4, and a third vehicle 7 on the road section between the collecting points. Data can be transmitted between the vehicles 5, 6, 7 and a central point 11 via a digital mobile radio network 10. In itself, the central point can be hierarchically structured and have a plurality of decentralized sub-stations which take care of partial tasks, for example the performance of the communications themselves.

The collecting points are each defined by predetermined geographic positions. By means of the GPS system, not shown, the position of the vehicle is continuously determined and compared with the positions of the collecting points. In case of agreement it is determined that the vehicle 5, for example, is located at the collecting point 3. If the vehicle 5 later on reaches the collecting point 2, the fee for the section between the collecting points 2 and 3 is calculated by means of the fee structure applicable for this section, and user fees, already previously stored, are added. The total is then also stored in turn.

It is also stored in the vehicle device that a monitoring device 4 is disposed downstream of the collecting point 3. Since this is the case in connection with the collecting point 3, the vehicle device is caused to transmit control data to the central point 11 via the mobile radio network 10. When a vehicle 6 passes the monitoring point, the license numbers and, if desired, the shape of the vehicle 6 are recorded with the aid of video cameras 13, 14, 15, 16 and analyzed with the aid of image processing devices. In case of agreement between the control data and the recorded information, the data transmitted to the central point 11 are cancelled. However, if a vehicle 6 is recorded for which no correlating control data are available, a report is made via an output device 17, so that the unauthorized use can be followed. How this is to take place in detail lies beyond the invention and is left up to the user. Processing of these reports will preferably be done manually.

Once the user fees added up in the vehicle device have reached a predetermined amount, the vehicle device makes a connection with the central point 11 via the mobile radio network. Besides the fact that the predetermined user fees have been reached, data which identify the debit account to be charged are transmitted there. Then the memory in the vehicle device is set back by the predetermined amount. If it is deemed to be advantageous, the central point 11 can also provide billings for the vehicle owner or user and, if desired, collect the billed amounts from the bank 12 of the user.

Since considerably more time is available for the transmission of the data with the aid of the mobile radio network than during the passage through a collecting point, any arbitrary method for securing and encrypting of the transmission can be used. For example, sufficient time is available for building a bidirectional connection, so that in case of errors which cannot be corrected, even when using an error-connecting code, a repetition of the transmission can take place.

The fee structure t at a collecting point i is determined in the vehicle device by the chip card by means of a set of parameters and a unit base fee x in accordance with the following formula:

$$t_{collecting\ point(i)}=a\cdot x^{n0}+b\cdot x^{n1}+c\cdot x^{n2}+\ldots$$

In this case the powers n0, n1, n2, etc., can all be the same or increase or follow any arbitrary other definitions. Each parameter (a, b, c, . . . ) represents a defined influence value —for example a for the type of vehicle, b for the date, c for the time, d for the vehicle density, and others. The unit base fee x has the dimension of a monetary value, so that the result of the formula adds up to the fee to be paid. Following the calculation of the fees, the appropriate units are initially locally debited on the chip card to an intermediate account. Thus minimal amounts of a few pennies need not be individually transmitted with the entire security process of electronic money transfer and are instead added up on the chip card.

Each debiting of fee on the chip card is also logged in the form of a control data set in a transaction memory on the chip card. As described above, this data set is required for monitoring and is furthermore used by the holder of the card as proof in case of possible complaints.

No data regarding the distance travelled, for example the individual passed collecting points, need be transmitted when transmitting added-up fees via the mobile radio network. This has the advantage that a conclusion regarding a defined route is no longer possible.

FIG. 2 represents a block circuit diagram of an exemplary embodiment of a vehicle device for executing the method in accordance with the invention. A processor 21 is used for controlling the individual sequences and contains, among others, a read-only memory 22 for the program and a read/write memory 23 for variable data. A direction-finding device 24 and a transmitter/receiver device 25 for mobile data communications is connected to the processor 21. The transmitter/receiver device 25 can operate, for example, in accordance with the GSM standard and, if desired, can also be combined with a mobile radio device.

Furthermore, a display unit 26, for example an LCD display, and an input unit 27 are connected to the processor 21. Finally, the processor 21 is connected with a chip card read/write device 28, into which a chip card 29 can be inserted, which contains a processor 30, a read-only memory 31 and a data memory 32.

The monitoring device represented in FIG. 3 comprises a plurality of video cameras 41 which, if required, operate in the infrared range, and spotlights or infrared spotlights 42. The signals generated by the video cameras 41 are supplied to an image processing computer 43, by means of which a character determination is possible. A transmitter/receiver unit 44, by means of which data can be transmitted to and from the central point 11, is connected to the image processing computer 43.

The central point represented in FIG. 4 consists of a central computer 51 which includes a security box 52 besides the customary memory devices. Transmitter/receiver devices 53, 54, 55 for communicating with the mobile radio network 10, the monitoring devices 4 and the banks 12 (FIG. 1) are connected with the central computer 51.

It is possible to proceed as follows in connection with the collection of fees and monitoring of vehicles without a vehicle device. User fees for a defined period of time must be prepaid for the route which is intended to be used at a predetermined paying point and the motor vehicle license number must be reported. Corresponding control data sets are generated by this. These are provided to the monitoring stations located in the area of the route for which payment was made. Because of this the vehicle is classified as "correctly paid" during the defined period of time when passing a monitoring device on this route, provided the data recorded by the monitoring device correspond with the control data set. In this case the data relating to the vehicle are cancelled again.

If there is no agreement, this is a non-payer or wrong payment was made. In connection with these it is possible to initiate compulsory measures, such as a ticket, for example.

We claim:

1. A method for determining user fees for a vehicle traveling over traffic routes and/or traffic areas, the method comprising:

determining an actual position of the vehicle using a position determination device located in the vehicle;

comparing the actual position of the vehicle with a plurality of predetermined positions assigned to a plurality of virtual collection points using a processing device located in the vehicle;

calculating the user fees with the processing device for the vehicle from fee structure data stored in the vehicle upon the actual position of the vehicle matching one of the plurality of predetermined positions of the virtual collection points; and transmitting the calculated user fee from the vehicle to a central point.

2. The method in accordance with claim 1 further comprising storing the calculated user fees in a memory located in the vehicle, and wherein said transmitting comprises transmitting the calculated user fees to the central point periodically when a predetermined amount of calculated user fees has been stored in the memory.

3. The method in accordance with claim 2 further comprising receiving a credit transmitted from the central point that is stored in the memory of the vehicle and debiting the calculated user fees from the credit.

4. The method in accordance with claim 2 further comprising storing control data in the memory which permits control of the user fee calculation based on data which characterize the vehicle, the traveled route and the fee structure.

5. The method in accordance with claim 2, wherein the memory is a chip card.

6. The method in accordance with claim 1 further comprising storing the predetermined positions of the virtual collecting points in the vehicle.

7. The method in accordance with claim 1 further comprising transmitting the predetermined positions of the virtual collecting points from the central point to the vehicle at predetermined intervals.

8. The method in accordance with claim 1 further comprising periodically transmitting the predetermined positions of virtual collecting points in a locally limited area via a digital radio network.

9. The method in accordance with claim 1 further comprising storing said fee structure data in the vehicle in the form of a data bank.

10. The method in accordance with claim 1 further comprising transmitting said fee structure data periodically from the central point to the vehicle via a digital radio network.

11. The method in accordance with claim 1 further comprising transmitting the fee structure data from the central point to the vehicle for a locally limited area via a digital radio network.

12. The method in accordance with claim 1 further comprising placing a plurality of monitoring devices downstream of the virtual collecting points, informing the vehicle a digital radio network which virtual collecting points have downstream connected monitoring devices, reading at these virtual collecting points a control data set of the fee calculation out of a memory at the respective virtual collecting point, transmitting the data to the monitoring device, comparing the received data with the characteristics of the vehicle including motor vehicle license number and a type of motor vehicle.

13. The method in accordance with claim 12 further comprising canceling the control data received by the monitoring device in case of agreement of the data obtained from the monitoring device and the control data in the vehicle.

14. The method in accordance with claim 12 further comprising generating control data when a user fee for a predetermined route is paid at a virtual collection point for a defined motor vehicle license number, and wherein that generated control data is supplied to one or more of the monitoring devices located within the area of the route where the user fees were paid.

15. The method in accordance with claim 1, wherein the data transmission is secured by authentication and encrypting.

16. The method in accordance with claim 15, wherein said encrypting comprises DES encryption.

17. The method in accordance with claim 15, wherein the motor vehicle license numbers are one-way encrypted using a triple DES method.

18. The method in accordance with claim 15, wherein the digital mobile radio network is a GSM network.

19. A system for the determination of user fees for a vehicle traveling over traffic routes and/or traffic areas, comprising:

a position determination device located in the vehicle which determines an actual position of the vehicle;

a processing device located in the vehicle which compares the actual position of the vehicle with a plurality of predetermined positions assigned to virtual collection points, and which, upon agreement between the actual position and one of the predetermined positions, calculates the user fees from fee structure data stored in the vehicle; and a terminal device for transmitting the user fee data to a central point.

20. The system in accordance with claim 19 wherein said processing device comprises a chip card read/write device in the vehicle.

21. The system in accordance with claim 19, wherein the device located in the vehicle forms a structural unit together with a car radio.

22. The system in accordance with claim 19, wherein an indicator device of the car radio is used as an output unit for the system.

23. The system in accordance with claim 21 further comprising a keyboard as an input unit to the system.

24. A device within a vehicle for determining user fees for the vehicle traveling over traffic routes and/or traffic areas, the device comprising:

means for determining an actual position of the vehicle;

means for comparing the actual position of the vehicle with a plurality of predetermined positions assigned to a plurality of virtual collection points;

means for calculating the user fees for the vehicle from fee structure data stored in the vehicle upon the actual position of the vehicle matching one of the plurality of predetermined positions of the virtual collection points; and means for transmitting the calculated user fee from the vehicle to a central point with a terminal device.

* * * * *